US00RE45077E

(19) United States
(12) Reissued Patent
Shiota et al.

(10) Patent Number: US RE45,077 E
(45) **Date of Reissued Patent: *Aug. 12, 2014**

(54) NETWORK PHOTOGRAPH SERVICE SYSTEM

(75) Inventors: Kazuo Shiota, Tokyo (JP); Nobuyoshi Nakajima, Kanagawa-ken (JP); Shuichi Ohtsuka, Ashigarakami-gun (JP)

(73) Assignee: FUJIFILM Corporation, Tokyo (JP)

( * ) Notice: This patent is subject to a terminal disclaimer.

(21) Appl. No.: 13/566,835

(22) Filed: Aug. 3, 2012

Related U.S. Patent Documents

Reissue of:
(64) Patent No.: 7,945,486
Issued: May 17, 2011
Appl. No.: 12/252,129
Filed: Oct. 15, 2008

U.S. Applications:
(60) Division of application No. 09/954,964, filed on Sep. 19, 2001, now Pat. No. 7,885,864, which is a continuation of application No. 08/970,427, filed on Nov. 14, 1997, now Pat. No. 6,324,521.

(30) Foreign Application Priority Data

Nov. 18, 1996 (JP) ..... 1996-306273
Sep. 19, 1997 (JP) ..... 1997-255037
Sep. 30, 1997 (JP) ..... 1997-266569

(51) Int. Cl.
*G06Q 30/00* (2012.01)

(52) U.S. Cl.
USPC ..... 705/26.8; 705/1.1; 705/27.1

(58) Field of Classification Search
USPC ..... 705/26.1, 27.1, 1.1
See application file for complete search history.

(56) References Cited

U.S. PATENT DOCUMENTS 5,029,312 A 7/1991 Goenner
5,237,265 A 8/1993 Peier et al.
5,327,265 A 7/1994 McDonald (Continued)

FOREIGN PATENT DOCUMENTS

EP 649121 A 4/1995
EP 0649121 A2 4/1995

(Continued)

OTHER PUBLICATIONS

"Alliance Launches Online Film Finishing", Report on Electronic Commerce, vol. 3, No. 5, Mar. 5, 1996, p. 1-4.

(Continued)

*Primary Examiner* — Thomas M Hammond, III
(74) *Attorney, Agent, or Firm* — Birch, Stewart, Kolasch & Birch, LLP

(57) ABSTRACT

By providing a network photograph service, prompt service can be provided to a customer without losing the advantages of easier understanding of where to access when placing an order and easier collective data management. A service center receiving an order of a printing service, and a minilab or a special laboratory spread across a plurality of places, are able to communicate through a network. A center server in the service center selects and assigns which photo-finishing laboratory will print the ordered picture, in response to order information transferred from a customer via the network. Thus, the printing processing can be carried out by a photo-finishing laboratory specified by the customer, instead of at the center server.

2 Claims, 8 Drawing Sheets

(56) References Cited

U.S. PATENT DOCUMENTS

| | | | |
|---|---|---|---|
| 5,327,526 | A | 7/1994 | Nomura et al. |
| 5,477,353 | A | 12/1995 | Yamasaki |
| 5,515,511 | A | 5/1996 | Nguyen et al. |
| 5,720,036 | A | 2/1998 | Garfinkle et al. |
| 5,793,938 | A | 8/1998 | Jackson, Jr. |
| 5,799,219 | A | 8/1998 | Moghadam et al. |
| 5,926,288 | A | 7/1999 | Dellert et al. |
| 5,974,401 | A | 10/1999 | Enomoto et al. |
| 6,018,774 | A | 1/2000 | Mayle et al. |
| 6,169,596 | B1 | 1/2001 | Shiota |

FOREIGN PATENT DOCUMENTS

| | | | |
|---|---|---|---|
| EP | 878956 | A | 11/1998 |
| EP | 0878956 | A1 | 11/1998 |
| GB | 286944 | A | 8/1995 |
| GB | 2286944 | A | 8/1995 |
| JP | 6-214862 | A | 8/1994 |
| JP | 7-203099 | A | 8/1995 |
| JP | 7-221966 | A | 8/1995 |
| JP | 7-261279 | A | 10/1995 |
| JP | 8-44856 | A | 2/1996 |
| JP | 08044856 | | 2/1996 |
| JP | 8-95163 | A | 4/1996 |
| JP | 08095163 | A | 4/1996 |
| JP | 8-130554 | A | 5/1996 |
| JP | 8-241179 | | 9/1996 |
| JP | 8-241179 | A | 9/1996 |
| JP | 11-203360 | | 1/1998 |
| JP | 10-161248 | A | 6/1998 |
| JP | 410161248 | A | 6/1998 |
| JP | 11-203360 | A | 7/1999 |
| WO | WO 95-05050 | A | 2/1995 |
| WO | WO 95/05050 | A1 | 2/1995 |

OTHER PUBLICATIONS

"Beam me up a photo greeting card, Scotty", Drug Store News, vol. 18, No. 6, Apr. 1, 1996, p. 1-2.

"Let's Order Original Goods", Life with the Internet, Online Shopping, No. 7, Internet Magazine, No. 16, May 1996, with a partial English translation, pp. 1-8.

"Photofinishing Comes To The Web", Newsbytes News Network, Mar. 7, 1996, p. 1-2.

Hiroshi et al., "Large-Volume Image Data Processing Method at Kyodo News", Fujitsu, vol. 47, No. 2, Mar. 1996,with a partial English translation, p. 1-11.

Incorporate Photographs into Works Produced by Professionals, Image Processing Service through the Internet, Nikkei Multimedia, Aug. 1997, with a partial English translation, pp. 1-11.

Photonet Online Web Page (http://www.photonetonline.com); Feb. 12, 1998, p. 1-8.

Wolf Photonet Web Page (http://wolfnetphoto.com), Jan. 1999.

Hiroshi Numazu et al., "Large-Volume Image Data Processing Method at Kyodo News", Fujitsu, vol. 47, No. 2, Mar. 1996 and a partial translation thereof.

"Let's Order Original Goods!", Life with the Internet, Online Shopping No. 7, Internet Magazine, No. 16, May 1996, and a partial translation thereof.

Incorporate Photographs into Works Produced by Professionals, Image Processing Service through the Internet, Nikkei Multimedia, pp. 86-91, Aug. 1997.

Photonet Online Web Page (http://www.photonet.com); Jan. 1999.

"Photofinishing Comes to the Web", Newsbytes News Network; Mar. 7, 1996.

"Beam Me Up A Photo Greeting Card, Scotty", Drug Store News, v18; n6, p. 24; Apr. 1, 1996.

"Alliance Launches Online Film Finishing", Report on Electronic Commerce, V3, issue 5; Mar. 5, 1996.

NETWORK PHOTOGRAPH SERVICE SYSTEM

Matter enclosed in heavy brackets [ ] appears in the original patent but forms no part of this reissue specification; matter printed in italics indicates the additions made by reissue.

*This is a reissue of U.S. Pat. No. 7,945,486.*

This application is a Divisional of application Ser. No. 09/954,964, filed on Sep. 19, 2001, now U.S. Pat. No. 7,885,864 which is a continuation of application Ser. No. 08/970,427, filed on Nov. 14, 1997, now U.S. Pat. No. 6,324,521 and for which priority is claimed under 35 U.S.C. §120. This application claims priority of Application Nos. 8-306273, 9-255037 and 9-266569 all filed in Japan on Nov. 18, 1996, Sep. 19, 1997 and Sep. 30, 1997 under 35 U.S.C. §119; the entire contents of all are hereby incorporated by reference.

BACKGROUND OF THE INVENTION

1. Field of the Invention

The present invention relates to a network photograph service system which provides a customer with a photograph service via a network such as the Internet.

2. Description of the Related Art

For providing a photograph service to a customer, a network photograph service has been proposed which provides a variety of services such as the order of extra prints, attachment of a photograph image to an electronic mail message, and download of picture image data by installing a variety of equipment (for example, scanner, a printer, and a server computer comprising a large capacity disc (hereinafter called an image server)) in a major wholesale lab to enable a customer to save a picture recorded in the image server and access the image server via a network.

The advantage of the network photograph service is that a customer can order a print even when the customer is staying at home or in an office. However, not everything (such as depositing a film or receiving a print) can be carried out on a network. Therefore, it is normal to provide the service through other agencies, such as a local camera shop or a minilab.

Viewed from the customer's perspective, the more agencies there are, the more convenient it is. However, it is preferable to have only one wholesale lab which receives orders, from the viewpoint of easier understanding of where to access when placing an order, or easier data management. Therefore, when a network photograph service is provided, it is better if a wholesale lab has concentrated equipment so that as many agencies as possible can be dealt with.

However, in the above case where all equipment is concentrated in one large scale wholesale lab as described above, it is inevitable that the date of delivery of a print will be delayed, since a delivery path from an agency to the wholesale lab becomes longer, and a wait time after depositing a film at an agency and before collection of the film is necessary.

Even though more rapid processing can be carried out by increasing the number of the wholesale labs to shorten the delivery path while increasing the frequency of collection and delivery, the advantage of a network photograph service system is lost. Moreover, the increased frequency of collection and delivery leads to a rise in collection and delivery cost. Therefore, this idea is not a preferable solution.

SUMMARY OF THE INVENTION

Based on the above problems, an object of the present invention is to provide a network photograph service system which can provide a prompt service to a customer without losing the advantages of easier understanding of where to access when placing an order or easier collective data management.

A network photograph service system of the present invention comprises at least one laboratory server which has a communication ability via a network and is installed in a photo-finishing laboratory having a picture printer. The system further comprises a center server installed in a service center to receive a printing service order via the network. The center server carries out processing, comprising the steps of storing a picture recorded by a customer of each photo-finishing laboratory as digital image data, making the digital image data accessible on the network, selecting one out of a plurality of photo-finishing laboratories to output a print in response to order information transferred from the customer via the network, and providing a printing service requested by the order to the customer by transmitting instructing information to the laboratory server installed in the selected photo-finishing laboratory.

The "laboratory server" herein referred to means a server computer installed in an individual photo-finishing laboratory such as an over-the-counter minilab. The "center server" is a server computer installed in a service center which collectively manages image data. Both the laboratory and the center servers have a data recording medium such as a hard disc with a capacity sufficient to store necessary image data. The laboratory server plays the role of a so-called printer server, and connects to a picture printer (in the case where a plurality of picture printers exist, the connection to the printers can be switched from one to another).

The phrase "Receives a printing service order via a network" means that an order is transferred from a customer as the order information in a predetermined data format. More specifically, the format of the order information is, for example, disclosed on a web site on the Internet. A customer sends to the center server, via an electronic mail message, the order information created in accordance with the format. Alternatively, if a customer creates an order by inputting information on a predetermined screen, the order may be converted automatically into the predetermined format of the order information and transmitted to the center server.

The "picture image obtained by a laboratory" means a picture image obtained by scanning a film that a customer of the photo-finishing laboratory brought in for first printing. Alternatively, a picture image obtained from a memory or the like of a digital camera which is brought in by a customer, and which uses a variety of data reading transferring means such as a card reader, may be included as the picture image. These picture images are hereinafter referred to as digital image data.

The reading processing may be carried out at a service center (in a collective manner). However, if each photo-finishing laboratory carries out this processing, the date of delivery can be made sooner because collection, delivery and wait time are not necessary. In this case, it will be necessary to transfer the digital image data obtained by the laboratory to the center server. This data transfer may be carried out via the network each time the laboratory obtains digital image data, or collectively at a predetermined time. Alternatively, the center server may periodically take in the data from each laboratory server. In some cases (where the data are large), the data may be stored in a medium and then transferred without using a network.

The "network" means a network as represented by the Internet. The network is meant to include all communication means having a communication speed sufficient to transfer the order information and image data, such as a dedicated line, a CATV network, a dial-up connection, or a LAN.

The center server performs a process which comprises the steps of storing a picture recorded by a customer of each photo-finishing laboratory as digital image data, and making the digital image data accessible on the network so that the digital image data is collectively managed and the customer can refer to the digital image data. When an extra print of a picture is ordered, the picture to be printed is often selected by referring to all pictures recorded. The above image accessing function of the center server operates to carry out this selection on a display screen.

The phrase "selecting one photo-finishing laboratory out of a plurality of laboratories to output a print in response to order information" means to select a laboratory having special equipment, such as a print outputting laboratory. This occurs when the printing service requested by the order needs special equipment to provide the service, such as a request to generate a picture postcard or a creative calendar. Alternatively, by letting a customer specify the photo-finishing laboratory at which he/she receives a print, and by including information showing the specified laboratory in the order information, the specified laboratory may be selected as the laboratory to output the print. The phrase "Selecting one laboratory" means to include the case where only one photo-finishing laboratory exists, such that the sole laboratory is selected to output a print.

The "processing comprising the steps of providing a printing service to the customer" means all processing necessary for providing a printing service to the customer. For example, when an extra print of a picture is ordered from a photo-finishing laboratory, digital image data of the picture needs to be transferred in from another photo-finishing laboratory, since the extra print cannot be generated without digital image data of the picture. In other words, "the processing comprising the steps of providing a printing service to the customer" means not only outputting a print by a printer, but also a series of processing steps including such a data transfer.

The "order information" specifically means, for example, the processing number specifying what has been ordered (such as an extra print or a postcard generation), the image number identifying a picture, the size of the print, and the number of the print. The "instruction information" includes not only the order information but also information showing where digital image data can be obtained from (where the digital image data is stored) or the like. Thus, when the laboratory server which received the instruction information does not have the necessary image data, the server requests the center server or the image server of the laboratory specified as the server from which the image data are obtained transfer the digital image data. Alternatively, the image data necessary for printing may be included in the instruction information.

It is preferable for each laboratory server to store a picture recorded by a customer of the laboratory wherein the server is installed as high resolution image data. In this manner, it becomes unnecessary to obtain digital image data from another laboratory when an extra print is ordered by a customer of the laboratory.

When each laboratory server stores digital image data of its customer as described above, digital image data which have been stored in the center server and become accessible may be low resolution image data with a lower amount of data than that of the high resolution image data having been stored in the laboratory server. In other words, digital image data may be classified in such a manner that the digital image data of the laboratory server are used for outputting a print, while the digital image data in the center server are used for an access via the network.

When high resolution image data for outputting a print is stored in a laboratory server, it is more effective if the laboratory server carries out the printing, since the amount of data to be transferred decreases. Therefore, when the center server stores digital image data for access, it is preferable that the digital image data is stored in correlation with storage location information showing the laboratory server which has high resolution image data of the digital image, so that when the laboratory server to output a print is selected, the laboratory server storing the high resolution image data of the digital image whose printing has been ordered is selected based on the storage location information.

When a print is output from a photo-finishing laboratory different from the laboratory storing the digital image data, the charge for the printing service rises by a communication charge necessary to transfer the data. When such a data transfer occurs, the service charge paid by the customer should be shared by the laboratory which has output the print, as well as the laboratory which is storing the digital image data, since both laboratories contribute to providing the printing service. As described above, in the network photograph system of the present invention, the cost varies depending on the content of the instruction information transmitted by the center server, especially on whether or not a data transfer is necessary, or on the amount of data to be transferred. Therefore, the center server may manage transactions which occur between laboratories or between a laboratory and the service center by recording the processing instructions sent to each laboratory server via a transmission of instruction information. Thus, the record can be used for customer charge control or for use in an electronic settlement.

The "printing service" means not only services such as outputting an extra print or generation of a picture postcard as described above, but also all accompanying services carried out before the picture print reaches a customer. More specifically, this includes the mailing or delivery service instead of a reception of a finished print over a counter, the service to inform a customer via electronic mail that a print is ready or that a storage period of digital image data in a laboratory is about to expire, the service to extend the storage period by receiving electronic mail from a customer, the service that a customer can select the photo-finishing laboratory at which to receive a print, the service that ordered pictures are arranged in an album, and the service that a print is mounted on a photograph mount in the case of a memorial picture.

Therefore, "the instruction information" and "the order Information" are meant to include all information necessary for the accompanying service, such as how a print is received and the address or the electronic mail address of the recipient. Such information can be used not only for reference, but also for a variety of processing. In other words, with a printer for generating a mailing label connected to the laboratory server, processing such as an automatic mailing label print can be carried out by referring to the name and address of a recipient included in the instruction information, when "the instruction information" specifies mailing of a print.

In a service for generating a manipulated print such as a composite picture, a method using a template has been known. When such a service is provided, the center server may store a template enabling the template to be accessed on the network so that a customer can order a manipulated print using the template. When a manipulated printing service is requested by the order information, information regarding the template specified by the order information may be transferred to the laboratory server as a portion of the instruction information.

The phrase "information regarding the template" herein referred to means either the template itself or information showing a suffix of the template or where the template is stored.

However, like the case of the image data above, it is preferable if the amount of data to be transferred is less. Therefore, it is preferable that each laboratory stores a high resolution template for outputting a print, and the information regarding the template has a comparatively small data size such as the size of only a template ID.

When each laboratory server stores a high resolution template, the center server may store the template in the form of low resolution data which have a lower data size than the size of the high resolution data stored in the laboratory server.

The template in this specification is meant to include not only data but also a processing procedure such as a macro. More specifically, the template may be a background image comprising a blank space for positioning an image therein, or a background image and a procedure "to insert the specified picture in a blank of the background image", for example. Alternatively, the template may comprise procedures such as "to rotate the specified picture by 90°" or "to lower the saturation of the specified picture".

The network photograph service system of the present invention makes possible communication via a network between the service center to receive an order of a printing service and the laboratories scattered in each area. The center server selects the laboratory to output the ordered print in response to the order information transferred from a customer via the network, and assigns printing processing to each laboratory instead of carrying out the printing processing by itself. Therefore, collection and delivery of films or prints is reduced and a prompt service is provided to a customer. In this case, an order reception is carried out collectively by the service center, to provide advantages such as an easier understanding of where to access when placing an order, or easier collective data management.

If each laboratory server stores a picture recorded by a customer of the laboratory, where the laboratory server is installed as high resolution image data, no data transfer occurs when each laboratory is ordered to print the picture of the customer. A reduction in network load or in communication cost can thus be achieved in this manner.

Thus, the digital image data stored in each laboratory only has to be transferred when printing for necessity. Therefore, the digital image data stored in the center server may be low resolution image data whose resolution has been lowered to such a degree that no problem occurs in displaying the low resolution image data on a display screen when the image data is accessed. In this manner, disc space of the center server can be conserved.

When the laboratory to output a print is selected, if the laboratory storing high resolution image data of the digital image whose print has been ordered is selected, the network load or cost can be reduced, as compared with the case where another laboratory is selected. This is because large size data transfer is not necessary.

When a manipulated printing service using the template is provided as the printing service, if an order is received by disclosing the template as well as the digital image data of a customer on the center server and transmitting information identifying the template used for the processing to the laboratory server, a simple composite picture can be generated in the laboratory, and a prompt printing processing service can be provided.

On this occasion, if high resolution template data is stored in the photo-finishing laboratory as is the digital image data of the customer, it becomes unnecessary to transfer a template when the center server orders the laboratory server to carry out a manipulated printing service. In this manner, a reduction in network load or communication cost can be achieved.

Furthermore, if the template stored in the center server are low resolution data for display, disc space of the center server is saved.

Moreover, the cost varies depending on whether or not data should be transferred or on the amount of data to be transferred. Therefore, if the center server carries out transaction management between laboratories or between a laboratory and the center server based on the instruction information, a service charge control, an electronic settlement and the like becomes easier.

The network photograph service system becomes worthier if more laboratories taking part in the system exist over a wider area. Therefore, to make such a system truly worth while, an effort should be paid to increasing the number of affiliated laboratories by fully considering not only the convenience for a customer and effectiveness of the system, but also laboratory profits. In the form of a system where equipment is concentrated in a service center, over-the-counter laboratories become mere agencies and their profits decrease. Therefore, there is no reason for positively recommending a customer to use the network photograph service. On the other hand, in the present system, over-the-counter laboratories can gain a profit by providing a printing service. Furthermore, in the form where each laboratory stores its customers' high resolution image data, a job related to the data is assigned to the laboratory with priority over other laboratories. Therefore, the more its customers use the network photograph service, the more the laboratory profits.

In other words, the present invention can not only solve the technical problems described above, but can also overcome administrative problems which hinder spreading of a network photograph service system. Therefore, the advantage of the present system is extremely great.

The present invention will become more fully understood from the detailed description given hereinbelow and the accompanying drawings which are given by way of illustration only, and thus are not limitative of the present invention.

DESCRIPTION OF THE PREFERRED EMBODIMENT

Hereinafter, a network photograph service system of the present invention will be explained referring to the accompanying drawings. The form of a system in which equipment is concentrated in one wholesale lab, and its problems, will be explained first referring to FIG. 8.

Figure 8:
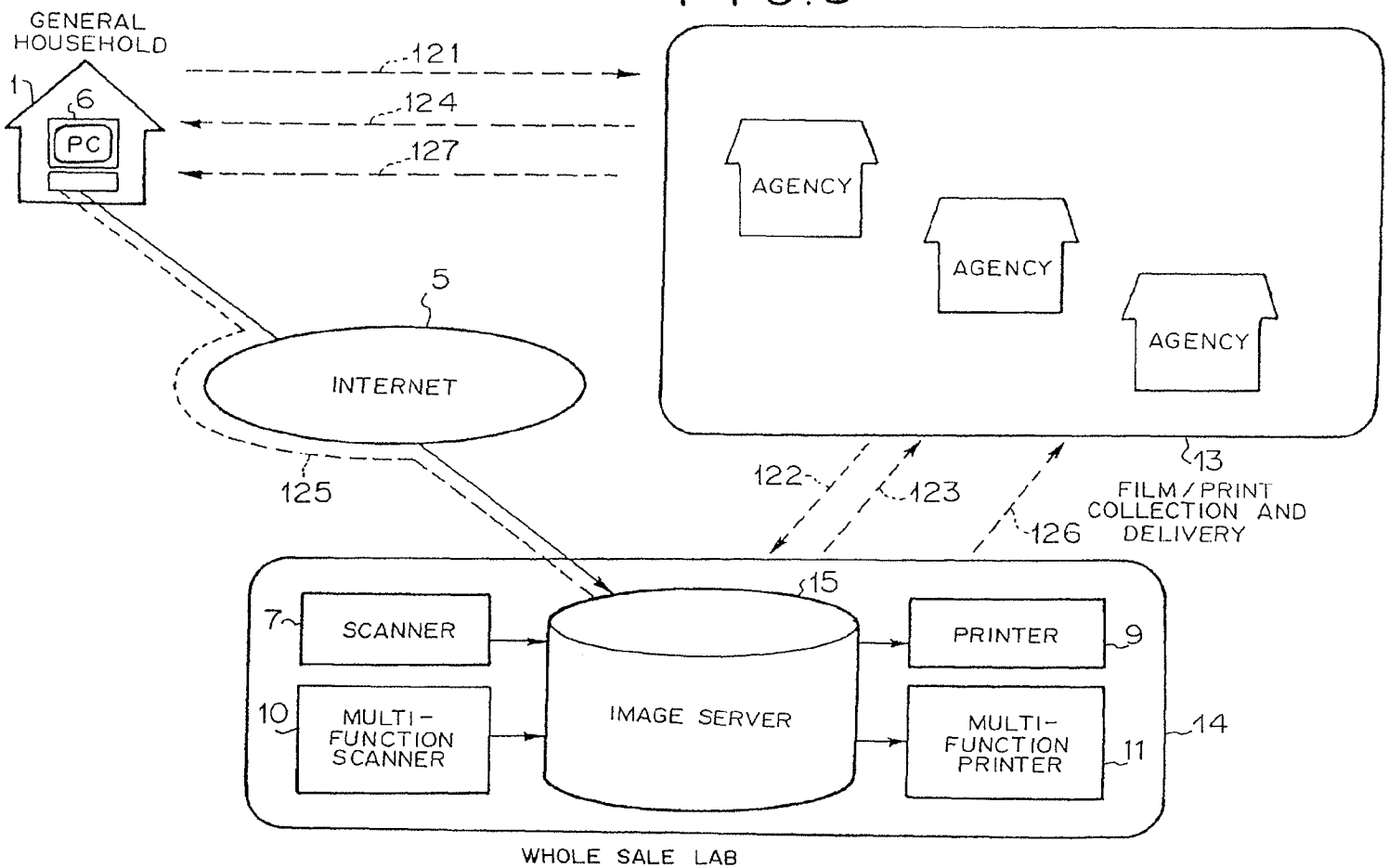
FIG. 8 is a diagram showing an example of how a network photograph service system in which equipment is concentrated in one laboratory is used.

In the system shown in FIG. 8, a customer 1 asks for first prints from an agency 13 (121). The first prints may be generated by the agency 13 itself or by a wholesale lab 14 following a request from the agency 13. In each case, a film (122) from the customer 1 is temporarily handed to the wholesale lab 14 (122). The wholesale lab 14 reads the film using a scanner 7 or the like, and stores pictures recorded on the film in an image server 15 as digital image data. If first prints have been ordered from the wholesale lab, the prints are generated by a printer 9 or the like, and delivered to the agency 13 (123), and then handed to the customer 1 via the agency 13 (124).

After the image server 15 has stored digital image data, the customer 1 can access the image server 15 via the Internet 5 (125), and order an extra print or the like looking at the stored picture image data on a display screen. In response to this order, the image server 15 generates a print using the printer 9 or the like, and hands the print to the customer 1 (127) by mail or via the agency (126).

As is obvious from the flow described above, the wholesale lab 14 should collect all films from customers of all agencies in this system. Therefore, it is possible that delivery of a print will be delayed due to a collection and/or delivery queue or a processing queue. Since the collection and delivery of the films and prints are carried out by hand, the date of delivery of the finished print may be delayed a couple of days due to the collection and/or delivery queue, depending on the number of collections and deliveries per day. In other words, in this system, it becomes easier to order an extra print or the like, but prompt service is not necessarily guaranteed. Furthermore, if an agency carries out first printing, input processing needs to be carried out by both the agency and the wholesale lab, for example. Therefore, this system often causes inconvenience.

Figure 1:
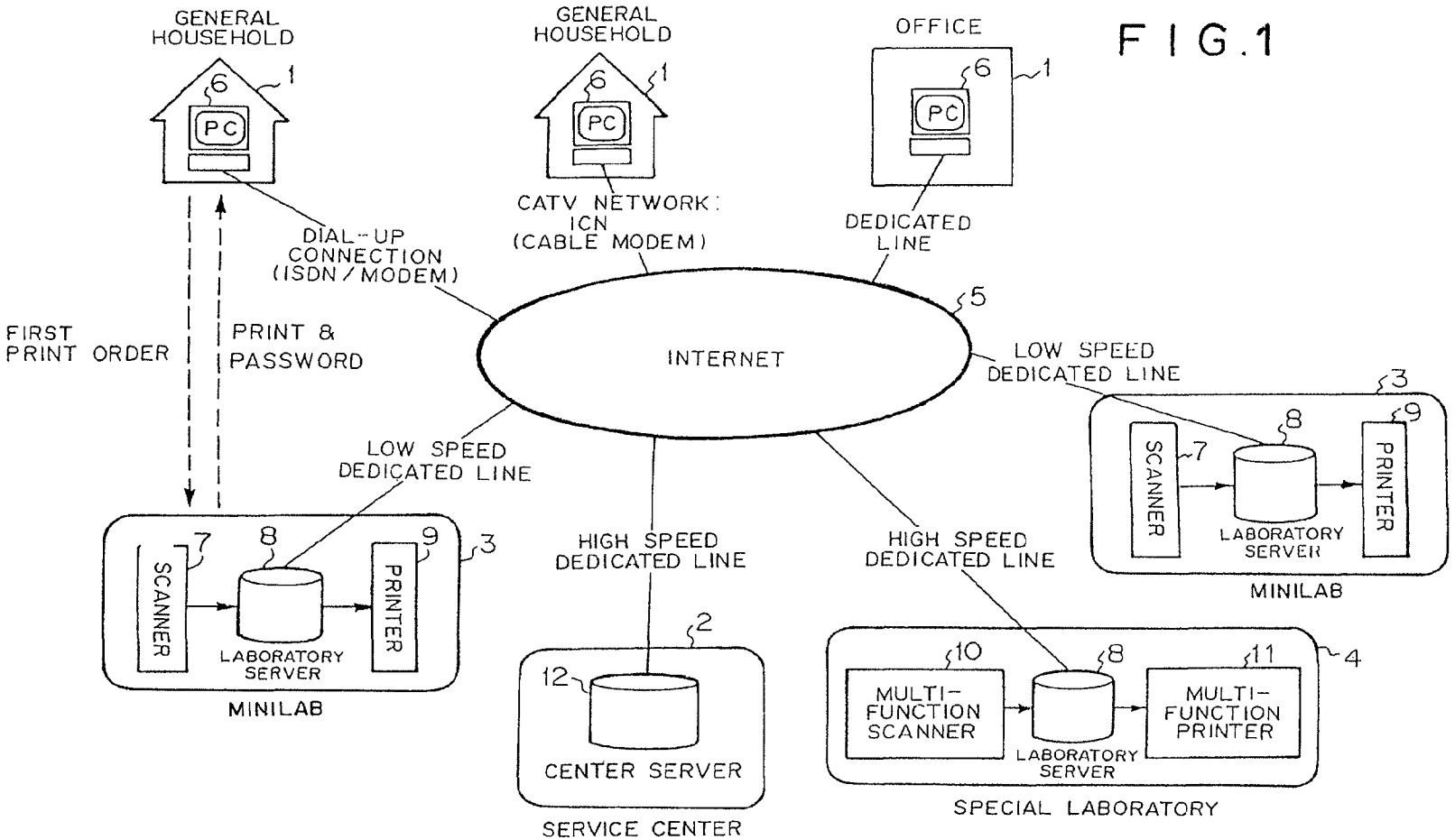
FIG. 1 is a diagram showing an embodiment of the network photograph service system of the present invention.

In the network photograph service system of the present invention, as shown in FIG. 1, a customer 1, a service center 2 which receives an order, and a minilab 3 or a special laboratory 4 with special equipment can all communicate via a network. On this occasion, since the service center 2 and the special laboratory 4 need to communicate frequently, they use high speed lines so that they can handle more orders promptly.

In the embodiment shown in FIG. 1, digital image data input is carried out by the minilab 3. When the customer orders first prints to the minilab 3, the minilab 3 reads a film using a scanner 7 and generates first prints using a printer 9. The digital image data read by the scanner 7 are stored in a laboratory server 8 after the generation of the first prints. On this occasion, low resolution image data which is the digital image data in a reduced resolution (hereinafter called a thumbnail image) are generated and transferred to a center server 12 in the service center 2. The laboratory server 8 stores not only the digital image data of the customer but also a template thereof.

The center server 12 in the service center 2 stores the thumbnail image transferred from each photo-finishing laboratory in correlation with the laboratory from which the image has been sent, while making the thumbnail image accessible on the network. On this occasion, the thumbnail image does not need a particularly high quality, since the customer uses the thumbnail image only to confirm the picture upon an order. In order to save disc space, it is more preferable if the thumbnail image has a smaller amount of data. In this embodiment, digital image data that the laboratory server 8 stores for outputting a print has 4 base pixels (approximately 1024-1792 pixels) which are necessary for outputting an L size print at 300 dpi, while the digital image data that the center server 12 stores for an access via the network has ¼ base pixels (approximately 368~256 pixels). The center server 12 also stores a thumbnail of the template that the laboratory server 8 stores so that the customer can access the template via the network.

When the digital image data is made accessible, the customer only has to confirm their own pictures. In other words, they do not want others to see their pictures. Therefore, by using a password, each customer has only a limited access to data he/she can see. The password is determined by a customer when he/she orders first prints. Alternatively, the minilab determines the password by assigning an appropriate one.

As for the access to the center server, the above service is provided in the form of a web page if on the Internet, and the customer can access the center server using a browser—such as Netscape Navigator. Alternatively, if the service is provided as another original communication service, dedicated software may be distributed to each customer. In each case, the customer 1 can request a printing service without going to the minilab 3 by carrying out a predetermined input on an order screen through confirmation of the thumbnail image of their picture stored in the center server or selection of a template via the network from their house or office, or through generation of order information in a predetermined format and transmission of the information via electronic mail.

Figure 2:
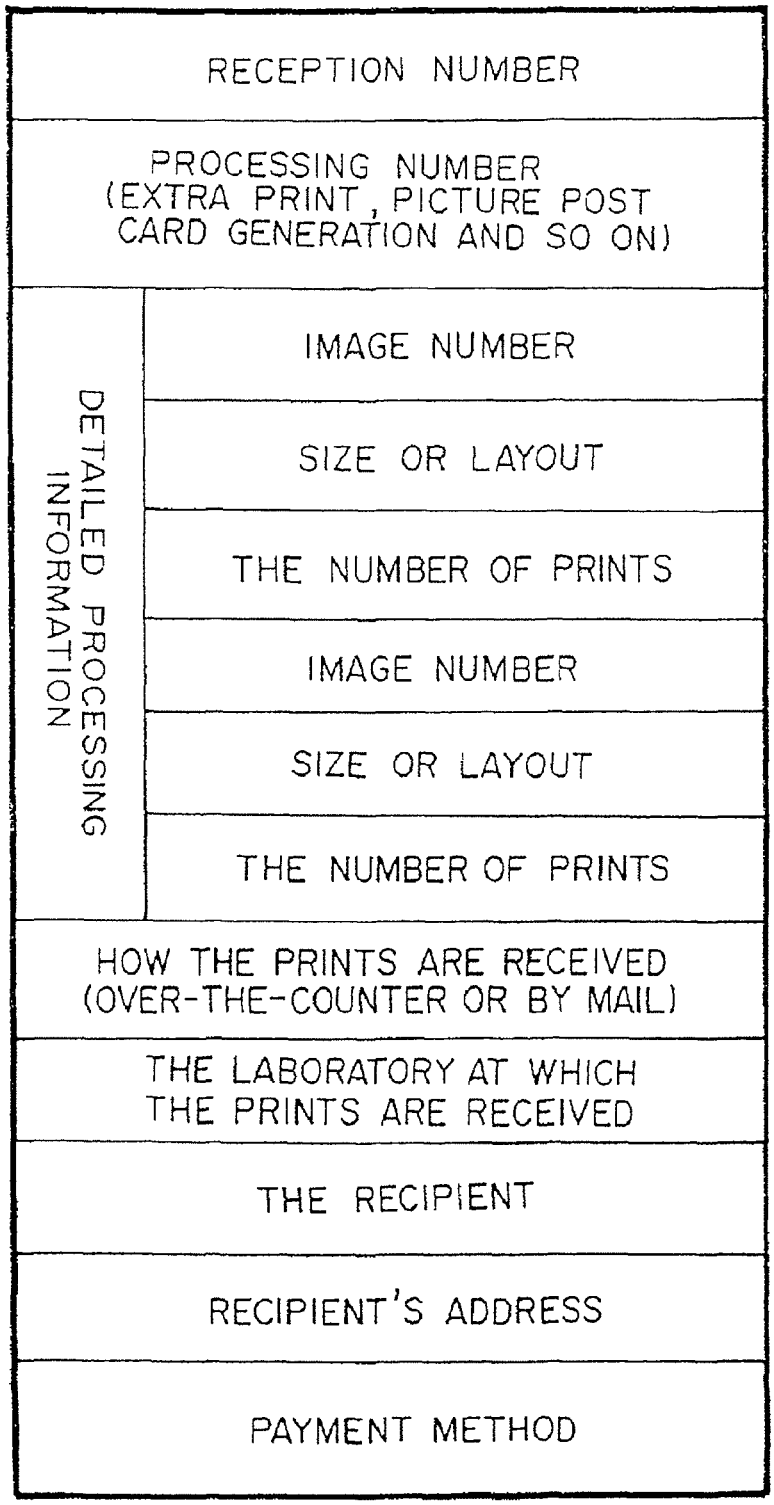
FIG. 2 shows an example of order information.

On this occasion, the order information transmitted from the customer to the center server 12 is like the example shown in FIG. 2. The order information contains information necessary for extra prints, such as the image number, the size, the number of extra prints, and how the finished prints are received. Furthermore, in an order of a manipulated print, the template number or the like is also included in the order information. Moreover, the content of the service which can be provided through the network includes not only the service accompanying the print output, but also all services related to the printing service. For example, when a storage period of digital image data in the laboratory 8 will expire in a few days but the customer has not decided the picture to order for an extra print, a request for an extended storage in this case can be considered as a part of the services related to printing.

A variety of data structures of the order information are also possible. For example, Microsoft Corp. has proposed a structured storage technique by which several kinds of data are stored in a file in a hierarchy. The order information can be generated as an order file shown in FIG. 3 by using this technique.

Figure 3:
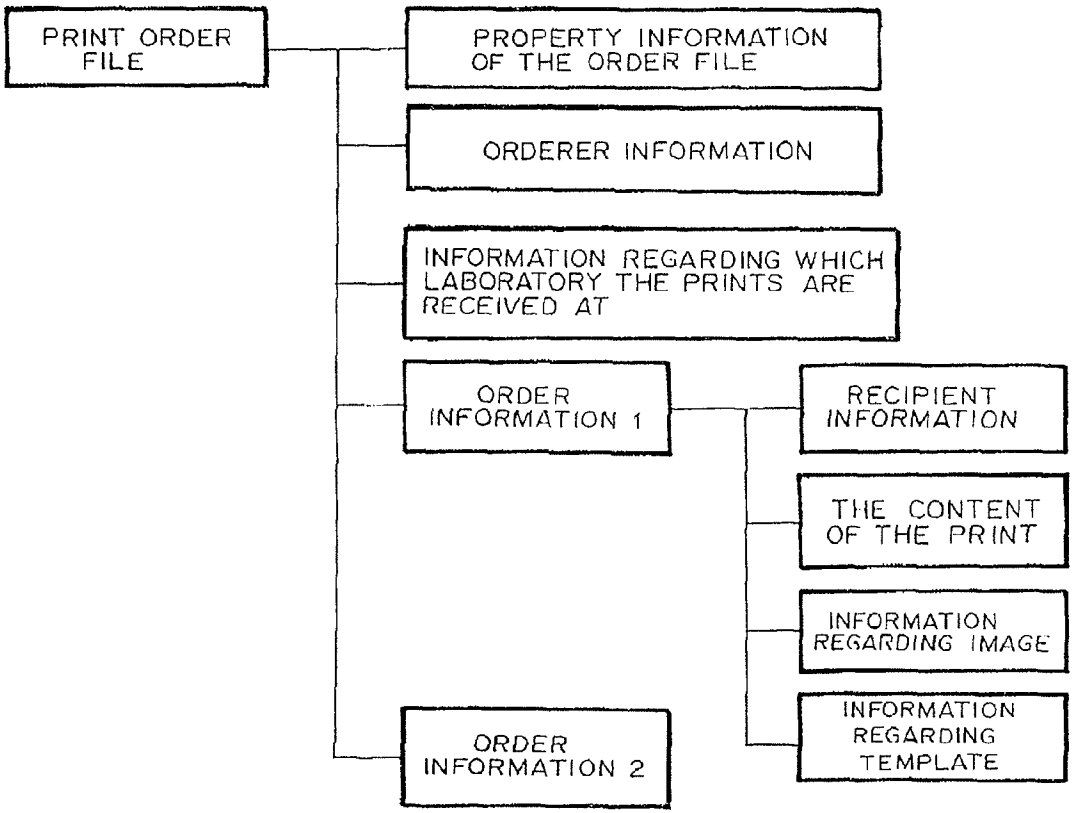
FIG. 3 shows another example of the order information.

The format of the order information may be defined depending on the service to be provided, and the format shown in FIGS. 2 and 3 are mere examples.

Figure 4:
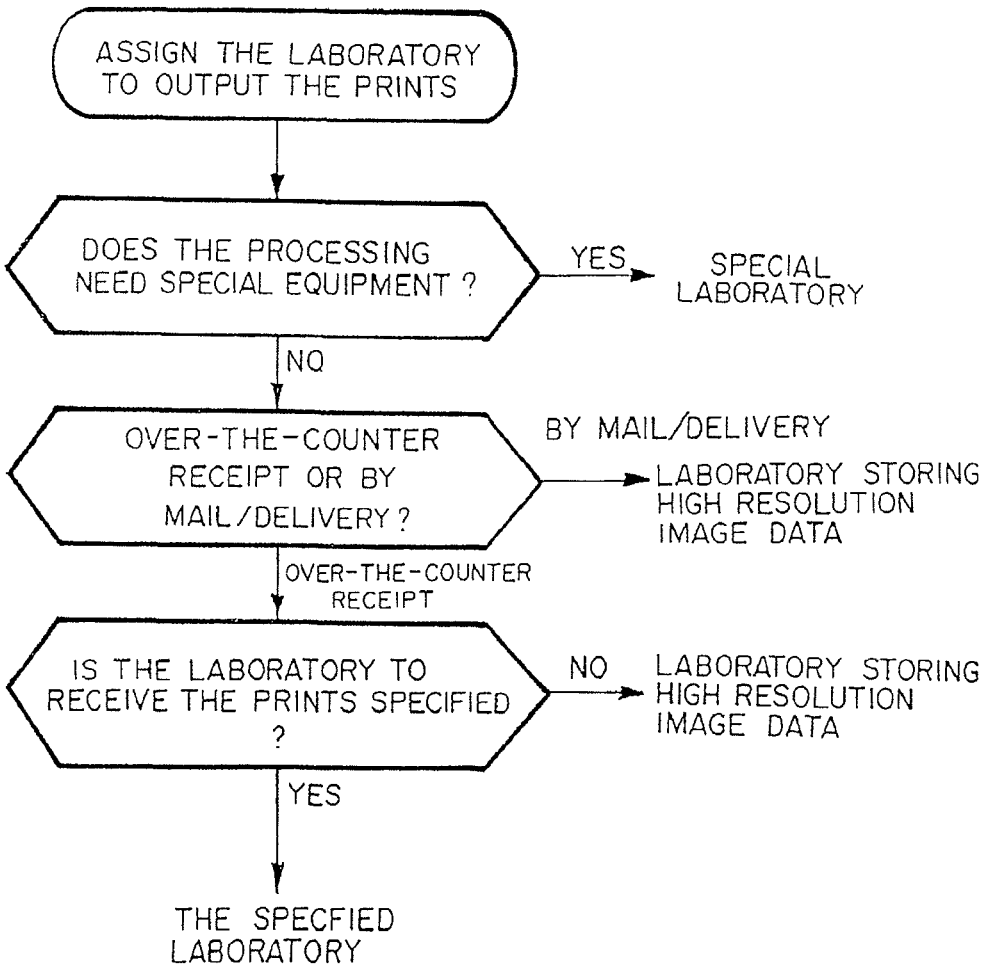
FIG. 4 is a flow-chart showing an example of laboratory assignment processing by a center server.

When the center server 12 receives such order information, it assigns the laboratory for outputting the ordered print. For instance, FIG. 4 shows an example of the processing to assign the laboratory for outputting the ordered print in the case where the order information in FIG. 2 is used. In this example, it is judged whether or not the requested processing needs special equipment by referring to the data showing the processing number. If the processing requires the special equipment, the special laboratory 4 is selected as the laboratory to output the print, and instruction information in a predetermined format is generated and transferred to the laboratory server 8 in the special laboratory 4. On this occasion, the special laboratory 4 does not have digital image data to be printed. Therefore, the instruction information includes the information showing the laboratory which does have the digital image data.

When processing of an ordinary extra print is requested, whether the customer wants to receive the print over the counter, by mail or by delivery can be verified by referring to order information data showing how the print is received. In the case of mailing or delivery, it does not matter to the customer which photo-finishing laboratory outputs the print he/she has ordered. Therefore, the laboratory which is most effective for the system, that is, the laboratory which stores the high resolution image data for outputting the ordered print, is selected.

When the customer wants to receive the print over the counter, the order information data showing the laboratory at which the print is received is referred to, and the laboratory is selected as the laboratory to output the print. When no laboratory is specified in the order information, the laboratory which stores the high resolution image data is selected. When the laboratory specified by the customer does not have the high resolution image data, the information showing where the high resolution image data is stored is included in the order information, as is the case where the special laboratory 4 is selected.

When the center server 12 transmits the order information to the photo-finishing laboratory selected as described above, it records the content of the order and calculates a data storage fee, a communication charge and the like to be paid to each laboratory by periodically summing up the amount of data transferred. In this manner, transactions between the center server 12 and each laboratory, or between the laboratories, are managed. This management is carried out in this manner, because each laboratory can gain an appropriate profit by printing or by storing digital image data of its customers. Such data are obviously used in a charge billing system to customers as well.

The laboratory server 8 which received the order information carries out the processing such as outputting an extra print according to the content of the order included in the order information, and hands the print to the customer or arranges mailing or the like. On this occasion, the hand-over to the customer or a mailing arrangement should be carried out by hand, as has been carried out conventionally. However, the laboratory server 8 can carry out processing to help such operations, for example, to print a mailing label automatically by referring to the order information data showing the recipient, and to notify the recipient of the print output finish by automatically sending him/her an electronic mail.

Figure 5:
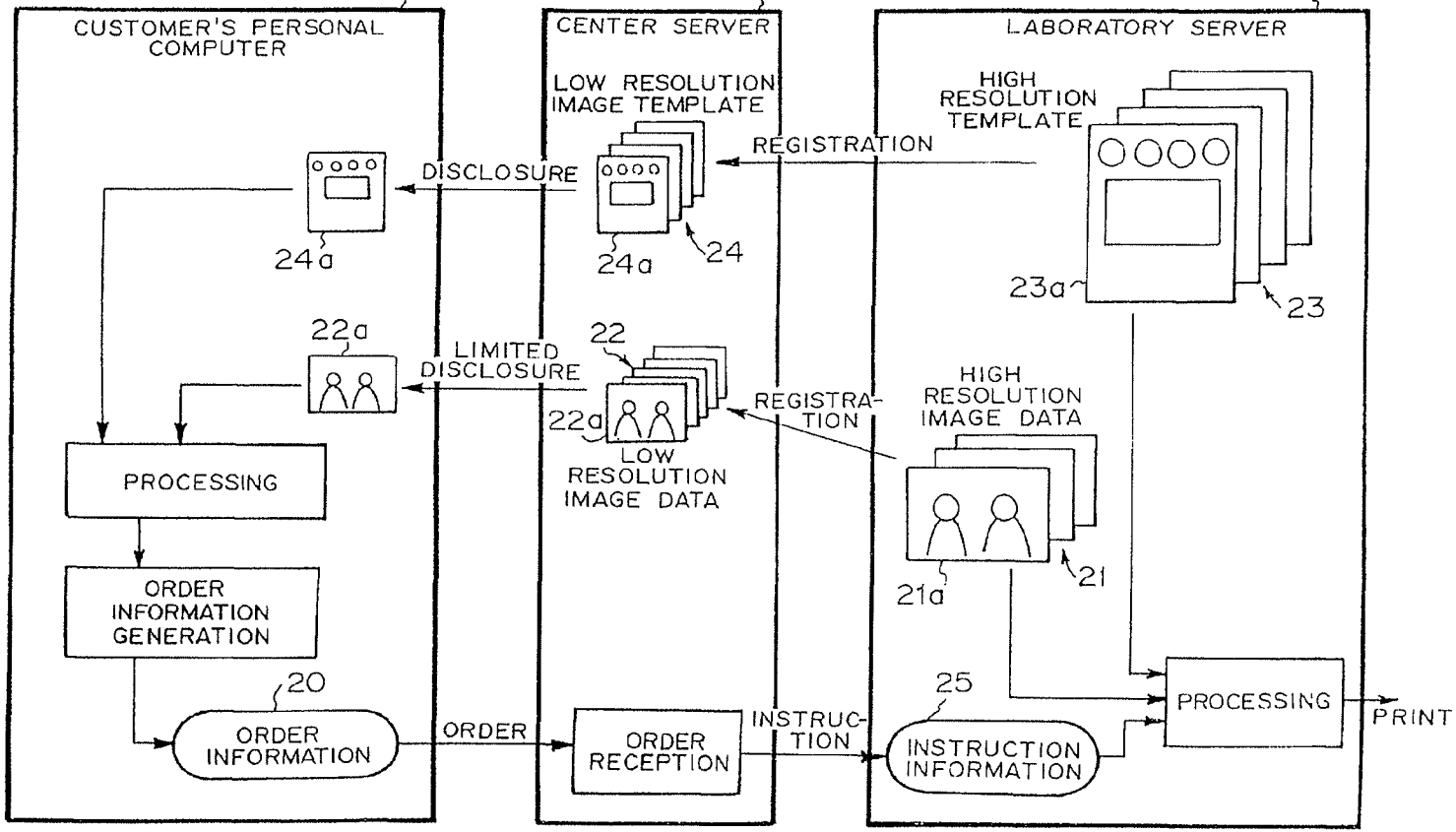
FIG. 5 is a diagram showing a flow of data in a manipulated printing service.

An example of such a service viewed from the flow of data is shown in FIG. 5. Regarding the manipulated printing service using the template, data managed by a personal computer 6 of the customer, the center server 12, and the laboratory server 8, in addition to the flow of the data, are shown in FIG. 5.

As described above, the laboratory server 8 stores high resolution image data 21 of the customer's picture and high resolution template 23 thereof. The center server 12 stores a low resolution template 24 which corresponds to the high resolution template 23, because whenever a new template is generated in the laboratory, a low resolution template corresponding to the new template is also registered in the center server. Meanwhile, low resolution image data 22 corresponding to the high resolution image data 21 are also registered in the center server upon a request from the customer.

The customer refers to (and downloads upon necessity) the low resolution image data 22 and the low resolution template 24 disclosed on the center server 12 and composes them using the personal computer 6. However, the processing carried out at this stage, such as composition, aims to generate the order information, and the processed image obtained through the processing is used for confirmation only. The procedure of the processing carried out by the customer is recorded by the function of dedicated software installed in the personal computer 6. The procedure is taken in as a portion of the order information 20 when the order information is generated. The order information 20 also includes information showing an image 22a and a template 24a specified and used by the customer.

The order information 20 is received by the center server 12, and the center server 12 transmits instruction information 25 to the laboratory selected by referring to the order information 20. At this time, the instruction information 25 includes the information showing the image 22a, the template 24a, and the processing procedure. The laboratory server 8, which receives the instruction information including such information, searches the hard disc for the high resolution template 23a corresponding to the template 24a and high resolution image data 21a corresponding to the image 22a, based on the information, and outputs the print after the processing following the processing procedure.

Figure 6:
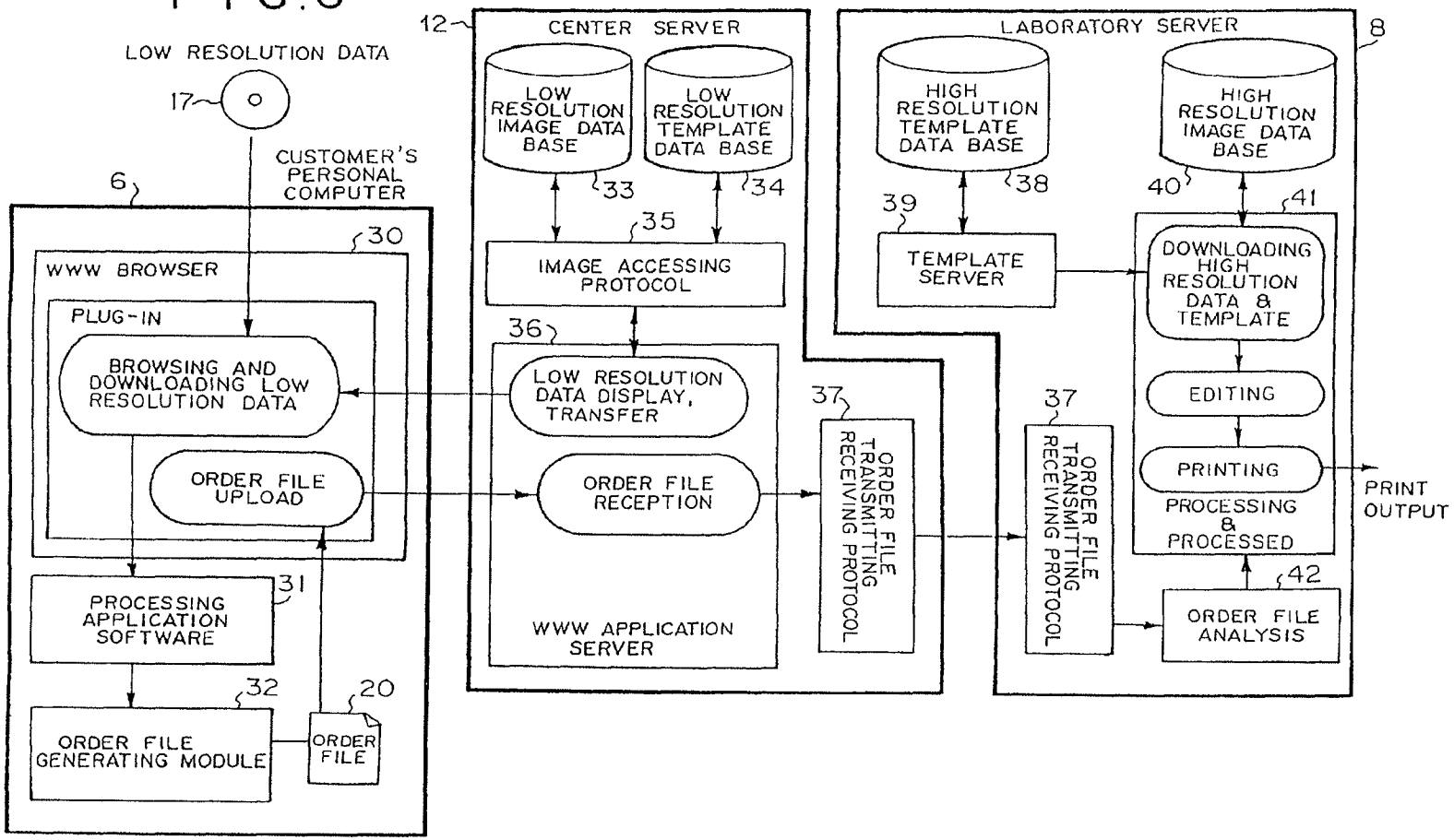
FIG. 6 is a diagram showing a configuration of a system for the manipulated printing service.

Such a service as described above can be implemented by the system configuration shown in FIG. 6, for example.

The personal computer 6 of the customer who carries out the order generation processing will be explained first. A WWW browser 30 has been installed in the personal computer 6. The program which carries out the order generation processing is provided as a plug-in of the browser. Alternatively, the function which carries out only a portion of the order generation processing is provided as the plug-in, and the other functions may be installed as application software independent from the browser.

The example in FIG. 6 shows the case where functions for browsing and downloading the low resolution image data and template, as well as a function for uploading an order file are provided as the plug-in, while a processing application 31 for processing the image data and template which have been downloaded, and an order file generating module 32, are provided as application software.

In this example, in the processing application 31, if the size and the number of a print are specified as in the case of ordinary printing (the printing by a printer connected to a personal computer), an order file is automatically generated by the function of the order file generating module 32.

If the low resolution image data and template are provided by a medium 17, the WWW browser 30 is used for browsing the data stored in the medium 17 and also for copying data from the medium 17 to the hard disc of the personal computer 6.

The configuration of the center server 12 will be explained next. As described above, the center server 12 is a server computer comprising a large capacity hard disc and a variety of communication equipment. The server computer 12 is used for providing the order receiving service in the form of a web page.

A WWW application server 36 which communicates with the WWW browser 30 of the personal computer 6 accesses low resolution image data base 33 and low resolution template data base 34 in response to the customer's request, and obtains necessary data, then transfers the data to the personal computer 6. The access to the data bases 33 and 34 may be carried out by an original protocol. However, by using a protocol 35 which is used by each company in common, it becomes possible to use a data base in another company's system in the same manner as the data base in the center server of its own company. In other words, it is preferable that the access to the data base or the like is carried out by defining the common image accessing protocol 35 for a search, a transfer, and access right management of the templates and images.

The WWW application server 36 receives the order file 20 uploaded by the user, selects the laboratory server 8 which is best-suited for processing the order, and transfers the order file 20 as it is or after adding necessary instruction information thereto. In other words, an order file transmitting receiving protocol 37 in FIG. 6 is the protocol for assigning the photo-finishing laboratory for printing, in response to the order content. It is also preferable to use a common order file transmitting receiving protocol.

A program 42 which analyzes the order file 20 transferred from the center server 12 and a program 41 which carries out the processing and printing based on the instruction in the order file 20 are installed in the laboratory server 8. After analyzing the order file 20, if the access right to the image specified in the order file is denied (if the password necessary for the access is not included in the order file), no processing and printing are carried out. If the access right is confirmed, the above program obtains necessary data from high resolution image data base 40 and high resolution template data base 38, and outputs the manipulated print.

Figure 7:
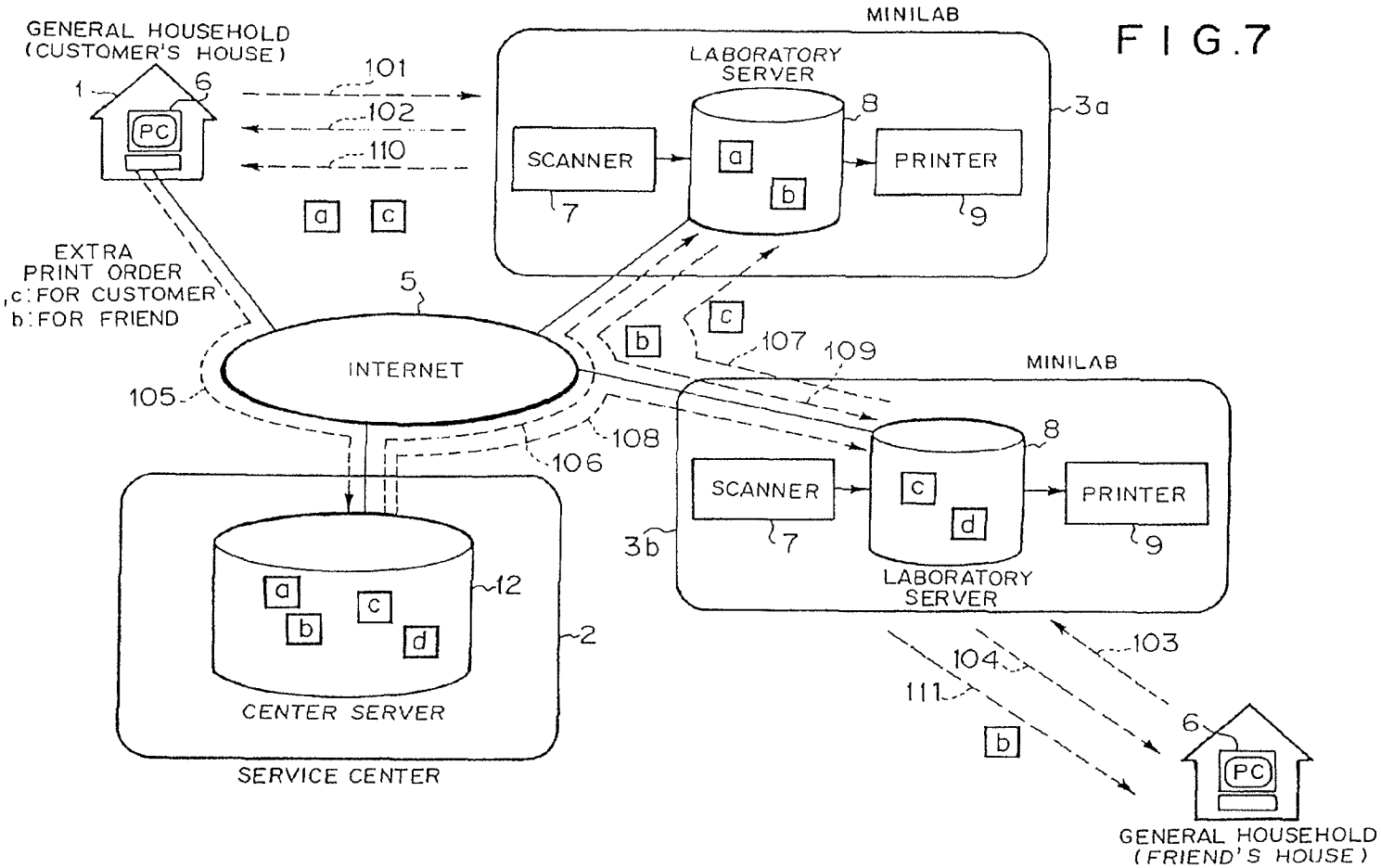
FIG. 7 is a diagram showing an example of how the network photograph service system of the present invention is used.

The configuration and the function of the network photograph service system of the present invention has been described above. Next, an example of how convenient the system is to use will be described with reference to FIG. 7.

For example, assume the case where a customer records pictures with his/her friend who came from overseas, and first prints are then ordered from a minilab 3a nearby (101). The first prints are immediately processed by the minilab 3a, and the film is returned to the customer when the prints are finished (102). Assume that the customer records other pictures with the same friend at the friend's house overseas. Conventionally, first prints of pictures recorded on a trip have been ordered after the trip. However, since every operation, except for printing a film, can be carried out via the network in the network photograph service system of the present invention, it is highly likely that this system has affiliated photo-finishing laboratories overseas. Therefore, even when first prints are ordered from a minilab 3b near the friend's house (103), and the prints are received there (104), an extra print can be ordered after the customer returns to his/her country.

After the customer returns, he/she accesses the center server 12 from the personal computer 6 at home and orders extra prints of these pictures (105). At this time, for example, among the pictures whose first prints were ordered from the minilab 3a, an extra print of a picture a is ordered for the customer while a picture b is for the friend, and among the pictures whose first prints were ordered from the minilab 3b, an extra print of a picture c is ordered for the customer.

As for the pictures for the customer, the minilab 3a is specified as the laboratory at which the prints are received. As for the picture for the friend, mailing may be specified as the method to receive the print. However, in the case of air mail, it takes more than one day for the print to reach the friend. On the other hand, if an order is carried out with the friend being specified as the recipient and the laboratory 3b as the laboratory at which the print is received, the print can reach the friend on the day of the order at the earliest.

When such an order is carried out, the center server 12 instructs the image server in the minilab 3a to output the prints of the pictures a and c, while notifying the image server of the network address of the laboratory server in the minilab 3b which stores the picture c (106). In this manner, the laboratory server in the minilab 3a can obtain the digital image data of the picture c by a transfer of the data from the laboratory server in the minilab 3b (107). Likewise, the center server 12 instructs the printing of the picture b to the minilab 3b and notifies the laboratory 3b of the network address of the laboratory server in the minilab 3a which stores the picture b (108). In this manner, the laboratory server in the minilab 3a can obtain the digital image data of the picture b by a transfer of the data from the laboratory server in the minilab 3a (109). By such transfer processing of the digital image data, the pictures a and c are printed at the minilab 3a and provided to the customer (110), while the picture b is printed at the minilab 3b and provided to the customer's friend (111). In this system, if the customer notifies the friend of the customer's password, the friend can order a picture he/she wants directly.

As shown by the above examples, according to the network photograph service system of the present invention, the printing service can be received upon necessity, at a desired place, and in a shorter time than before, regardless of the location of the laboratory where the first prints have been ordered. This is extremely convenient not only for the example shown in FIG. 5 but also for business, such as the case where a picture suddenly becomes necessary in a business activity going on from place to place.

In the embodiment described above, the center server 12 stores the thumbnail images for the access via the network while the laboratory server 8 stores the high resolution image data for printing. However, it is needless to say that the center server may store the high resolution image data for printing which are also used as the image for access, while the laboratory server 8 carries out printing only, without storing the high resolution image data.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method for ordering a print at a personal computer, the method comprising the steps of:

receiving an input of a password for accessing, through a network, image data stored in a server;

accessing and obtaining, using the personal computer through the network, image data disclosed on the server representing a low-resolution image of the image, the print of which is being ordered, and template image data disclosed on the server representing a low-resolution template image of a template that is being selected with the image, the print of which is being ordered, wherein the data amount of the image data representing the low-resolution image of the image is lower than that of image data representing a high-resolution image of the image that is being used to produce the print, and wherein the data amount of the template image data representing the low-resolution template image of the template is lower than that of template image data representing a high-resolution template image of the template that is being used to produce the print;

receiving an instruction by the server for synthesizing image data by combining the obtained image data representing the low-resolution image and the obtained template image data representing the low-resolution template image;

synthesizing the obtained image data by the server based on the instruction and displaying the synthesized image on the personal computer for confirmation;

receiving an order for a photograph print service from the personal computer, the order including a method for receiving a print of an image corresponding to the synthesized image data;

generating order information by the personal computer about the synthesized image data, the order information representing the content of the order for the photograph print service, and the order information including a processing procedure for inserting the low-resolution image into a blank area of the low-resolution template image; and sending the order information to the server.

*2. A method for ordering a print at a personal computer, the method comprising the steps of:*

*accessing and obtaining, using the personal computer through a network, image data disclosed on a server representing a low-resolution image of an image, the print of which is being ordered, and template image data disclosed on the server representing a low-resolution template image of a template that is being selected with the image, the print of which is being ordered, wherein the data amount of the image data representing the low-resolution image of the image is lower than that of image data representing a high-resolution image of the image that is being used to produce the print, and wherein the data amount of the template image data representing the low-resolution template image of the template is lower than that of template image data representing a high-resolution template image of the template that is being used to produce the print;*

*receiving an instruction by the personal computer for synthesizing image data by combining the obtained image data representing the low-resolution image and the obtained template image data representing the low-resolution template image;*

*synthesizing the obtained image data by the personal computer based on the instruction and displaying the synthesized image on the personal computer for confirmation;*

*receiving an order for a photograph print service from the personal computer, the order including a method for receiving a print of an image corresponding to the synthesized image data;*

*generating order information about the synthesized image data by the personal computer, the order information representing the content of the order for the photograph print service, and the order information including a processing procedure by which the low-resolution image has been inserted into a blank area of the low-resolution template image; and*

*sending the order information to the server.*

* * * * *